United States Patent [19]

Koleske et al.

[11] 4,163,114

[45] Jul. 31, 1979

[54] ESTER DIOL ALKOXYLATES

[75] Inventors: Joseph V. Koleske, Charleston; Robert J. Knopf, Saint Albans, both of W. Va.

[73] Assignee: Union Carbide Corporation, New York, N.Y.

[21] Appl. No.: 837,838

[22] Filed: Sep. 29, 1977

[51] Int. Cl.$^2$ .............................................. C07C 69/66
[52] U.S. Cl. ................................ 560/186; 260/405.4; 560/156; 560/170
[58] Field of Search ...................... 560/186, 156, 170; 260/465.4

[56] References Cited

U.S. PATENT DOCUMENTS

| | | | |
|---|---|---|---|
| 3,645,984 | 2/1972 | Dowbenko et al. | 260/78.4 |
| 3,959,201 | 5/1976 | Chang | 260/29.4 |

*Primary Examiner*—Paul J. Killos
*Attorney, Agent, or Firm*—Francis M. Fazio

[57] ABSTRACT

Novel ester diol alkoxylates produced by the reaction of an ester diol and an alkylene oxide. The reaction product is a vehicle useful in ink or paint formulations, as a solvent, and in adhesive formulations; it is also useful as an intermediate in the production of other valuable compounds and as a surfactant.

10 Claims, No Drawings

ESTER DIOL ALKOXYLATES

BACKGROUND OF THE INVENTION

The ester diols corresponding to the structural formula:

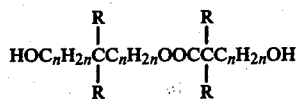

wherein n is an integer having a value of from 1 to 5 and R is an unsubstituted or substituted alkyl group having from 1 to 8 carbon atoms, are known. Such compounds are disclosed for example in U.S. Pat. No. 3,645,984 issued Feb. 29, 1972 to Dowbenko etal and in U.S. Pat. No. 3,959,201 issued May 25, 1976 to Chang.

Also known to those skilled in the art is the reaction of an alkylene oxide with initiators to produce the corresponding derivatives thereof, such as the polyoxyethylenes and the polyoxypropylenes. However, not previously suggested nor disclosed are the alkylene oxide derivatives of the ester diols of formula I nor their unexpected properties.

SUMMARY OF THE INVENTION

The novel ester diol alkoxylates of this invention are those defined by the structural formula:

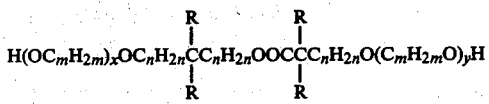

wherein m is an integer having a value of from 2 to 4, preferably 2 or 3; n is an integer having a value of from 1 to 5, preferably 1 to 3 and most preferably from 1 to 10; and R is an unsubstituted or substituted, linear or branched alkyl group having from 1 to 8 carbon atoms, preferably 1 to 3 carbon atoms. The substituents on the R group can be any inert group that will not interfere with the reactions involved and can be for example, cyano, halogen, alkoxyl, nitro, tertiary amine, sulfo, etc. In the formulas the variables R, m, n, x and y can be the same or different at the various locations.

DESCRIPTION OF THE INVENTION

The novel ester diol alkoxylates (II) are preferably produced by the catalytic reaction of an ester diol (I) with an alkylene oxide or mixtures of alkylene oxides at an elevated temperature as more fully discussed below. One can thus manufacture the mono, mixed blocked or capped adducts.

The alkylene oxides suitable for use in the production of the ester diol alkoxylates are the oxirane compounds such as styrene oxide, ethylene oxide, 1,2-propylene oxide, 1,3-propylene oxide, 1,2-butylene oxide, 1,3-butylene oxide and 1,4-butylene oxide as well as similar higher aliphatic monoepoxides.

The ester diols of formula I include 2,2-dimethyl-3-hydroxy-propyl 2,2-dimethyl-3-hydroxypropionate; 2,2-dimethyl-4-hydroxy-butyl 2,2-dimethyl-3-hydroxypropionate; 2,2-dimethyl-4-hydroxybutyl 2,2-dimethyl-4-hydroxybutyrate; 2,2-dipropyl-3-hydroxypropyl 2,2-dipropyl-3-hydroxypropionate; 2-ethyl-2-butyl-3-hydroxypropyl 2-ethyl-2-butyl-3-hydroxypropionate; 2-ethyl-2-methyl-3-hydroxypropyl 2-ethyl-2-methyl-3-hydroxypropionate; and the like.

During the reaction of the ester diol I with the alkylene oxide a catalyst is preferably used in a catalytically effective amount. The amount of catalyst is from 0.01 to 5 weight percent, preferably from 0.05 to 0.5 weight percent, based on the combined weights of ester diol I and alkylene oxide. The catalysts useful are known to those skilled in the art of alkylene oxide addition chemistry and require little further discussion here. Illustrative thereof one can mention boron trifluoride etherate, potassium, potassium hydroxide, sodium, sodium hydroxide, Lewis acids, sodium ethoxide, mineral acids, and the like.

The reaction of the ester diol with the alkylene oxide is carried out at a temperature of from 20° to 150° C., preferably from 50° to 120° C. for a period of time sufficient to complete the reaction between the reactants charged. The temperature is often dependent upon the particular catalyst selected and the alkylene oxide employed. The time will vary depending upon the size of the batch and the particular reactants and catalysts, and the reaction conditions employed.

The reaction can be conducted at subatmospheric, atmospheric or superatmospheric pressure. The pressure is not critical and sufficient pressure is generally used to retain the reactants in the reactor in liquid form.

The amount of alkylene oxide charged to the reaction is from about 2 moles to about 40 moles, or more, per mole of ester diol charged; preferably from 2 to 20 moles.

To minimize oxidative side reactions the reaction is preferably carried out under an inert gas atmosphere using nitrogen, argon or other inert gas.

If desired an inert solvent such as toluene, benzene or 1,1,1-trichloroethane can be employed. However, the reaction proceeds well in the absence of any such solvent. In most instances a solvent is not required as the ester diol is itself a liquid at the elevated temperatures employed and serves to maintain a liquid reaction system.

At the conclusion of the reaction the product, consisting of a mixture of the novel ester diol alkoxylates, is recovered as a residue product and can be used as such; distillation procedures can also be used to recover more refined products.

The ester diol alkoxylates can be used as solvents, vehicles in paint or ink formulations, water-borne coatings, as an intermediate in the production of other valuable compounds and as a surfactant.

In a typical embodiment, the ester diol and catalyst are charged to the reactor and the alkylene oxide is then added over a period of time while maintaining the desired temperature and pressure. At the completion of the addition the contents of the reactor are maintained at the selected conditions until substantially all of the alkylene oxide has reacted. The product can then be purified, if desired, and recovered by conventional procedures. In some instances one many obtain a product containing other glycols as by-products. This can be minimized by proper selection of reaction conditions and catalyst.

The following examples serve to further illustrate the invention. Unless otherwise indicated parts are by weight.

EXAMPLE 1

A reactor was charged with 408 grams of freshly stripped solid 2,2-dimethyl-3-hydroxypropyl 2,2-dimethyl-3-hydroxypropionate and 1.39 grams of potassium metal as catalyst and heated to liquify the solid. The reactor was purged with nitrogen and then over a 10 hours addition period 528 grams of ethylene oxide were added while maintaining a temperature of from 106° to 113° C. After all of the ethylene oxide had been added, the reaction was continued at 114° C. for 30 minutes to completion. The reaction product was neutralized with 1.69 grams of acetic acid and vacuum stripped at 60° C. and 1 mm of Hg pressure. The liquid ester diol ethoxylate recovered weighed 922 grams as the residue product containing a minor amount of by-products.

The ester diol alkoxylate produced had an average of about six (x+y of Formula II) ethyleneoxy units in the molecule. The average molecular weight was 480, the Brookfield viscosity was 194 cps. at 26° C. (no. 3 spindle, 100 rpm.), the specific gravity was 1.079 g/cc and the Gardner color was less than 2. The water dilutability was 250. Water dilutability defines the grams of water that can be added to 100 grams of the ester diol alkoxylate to achieve a haze point.

A coating composition was produced by blending 12 parts of the above liquid ester diol ethoxylate with 3.5 parts of hexamethoxymethylmelamine, 4 parts of water and 0.4 part of catalyst. The catalyst was 1½ mixture of p-toluenesulfonic acid, triethylamine and isopropanol. The composition was coated on a steel panel with a No. 60 wire-wound rod and cured in an oven at 350° F. for 20 minutes to yield a clear, hard, thermoset coating.

Similar coatings are produced with the products of the following examples.

In addition, one can react the ester diol ethoxylate with an isocyanate or anhydride to produce the corresponding modified ester diol ethoxylates that are useful as vehicles in coatings and inks.

EXAMPLE 2

Following the procedure similar to that described in Example 1, 792 grams of ethylene oxide and 612 grams of 2,2-dimethyl-3-hydroxypropyl 2,2-dimethyl-3-hydroxypropionate were reacted using 2.1 grams of potassium catalyst. The ethylene oxide feed time was about 11 hours.

The liquid ester diol ethoxylate residue product produced weighed 1,391 grams; it had an average of about six ethyleneoxy units in the molecule. The average molecular weight was 477, the Brookfield viscosity was 200 cps. at 24.5 C (No. 3 spindle, 100 rpm), the specific gravity was 1.08 g/cc and the Pt/Co color was 60. Water dilutability was 296.

EXAMPLE 3

Following the procedure similar to that described in Example 1, 528 grams of ethylene oxide and 612 grams of 2,2-dimethyl-3-hydroxypropyl 2,2-dimethyl-3-hydroxypropionate were reacted using 1 gram of potassium as catalyst. The ethylene oxide feed time was about 9 hours.

The liquid ester diol ethoxylate residue product produced weighed 1,128 grams; it has an average of about four ethyleneoxy units in the molecule. The average molecular weight was 392, the Brookfield viscosity was 168 cps. at 27° C. (No. 3 spindle, 100 rpm), the specific gravity was 1.07 g/cc and the Pt/Co color was 40. Water dilutability was 200.

EXAMPLE 4

Following the procedure similar to that described in Example 1, 220 grams of ethylene oxide and 510 grams of 2,2-dimethyl-3-hydroxypropyl 2,2-dimethyl-3-hydroxypropionate were reacted using 1.1 grams of potassium as catalyst. The ethylene oxide feed time was about 5 hours.

The liquid ester diol ethoxylate residue product produced weighed 730 grams; it had an average of about two ethyleneoxy units in the molecule. The average molecular weight was 295, the Brookfield viscosity was 285 cps at 25° C. (No. 3, spindle, 100 rpm) and the Pt/Co color was 75. Water dilutability was 86.

EXAMPLE 5

A stainless steel autoclave was charged with 3,011 grams of solid 2,2-dimethyl-3-hydroxypropyl 2,2-dimethyl-3-hydroxypropionate and 18 grams of boron trifluoride etherate and the contents were heated to 60° C. Then the autoclave was pressured to 10 psi with nitrogen and the ethylene oxide feed was started. A total of 2,604 grams of ethylene oxide was added over a period of about six hours while maintaining the reactor temperature of 65° to 68° C. and the pressure between 10 and 30 psi. After all of the ethylene oxide had been added the temperature was maintained at 65° C. until no ethylene oxide pressure remained in the reactor. The product was cooled to 40° C.; 2 weight percent of magnesium silicate neutralizing agent was added and the mixture was stirred at 40° C. for one hour. The temperature was raised to 90° C. and held while a vacuum was applied to remove volatile products. This vacuum was continued until the pressure in the reactor reached 5 mm. of mercury. The clear, colorless product was pressure filtered to remove insolubles. There was recovered 5,494 grams of the liquid ester diol ethoxylate residue product having an average of about four ethyleneoxy units in the molecule. The average molecular weight was 382, the Cannon Fenske viscosity was 90 cks at 100° F. and the Pt/Co color was 30; it had an acid value of 0.06 percent as acetic acid. Gas chromatographic analysis indicated that the product was free of neopentyl glycol and its adducts.

In a similar manner the mixed ester diol ethoxylate/propoxylate is produced using a mixture of ethylene oxide and propylene oxide as the feed material. Likewise, the ethoxylate/styroxylate is produced.

EXAMPLE 6

Following a procedure similar to that described in Example 1, 204 grams of 2,2-dimethyl-3-hydroxypropyl 2,2-dimethyl-3-hydroxypropionate and 440 grams of ethylene oxide were reacted at 99° to 115° C. using 1.5 grams of boron trifluoride etherate as the catalyst. The ethylene oxide feed time was about 4.5 hours and the mixture was heated an additional 0.75 hours after completion of the addition. Then 13 grams of magnesium silicate were added and the mixture was stirred overnight at 50° to 65° C. It was filtered, then stripped at 100° C. for one hour to a pressure of 5 mm. Hg.

The liquid ester diol ethoxylate residue product produced weighed 602.4 grams; it had an average of about 10 ethyleneoxy units in the molecule. The Brookfield viscosity was 193 cps at 30° C. (No. 3 spindle, 100 rpm), the specific gravity was 1.046 g/cc and the Gardner color was 1.5. Water dilutability was 15.6.

EXAMPLE 7

Following the procedure described in Example 6, 204 grams of 2,2-dimethyl-3-hydroxypropyl 2,2-dimethyl-3-hydroxypropionate was reacted with 440 grams of ethylene oxide using 1.5 grams of boron trifluoride etherate as the catalyst. The ethylene oxide addition time was about 7.5 hours.

The liquid ester diol ethoxylate residue product produced weighed about 629 grams after filtering and stripping. It had an average of about 10 ethyleneoxy units in the molecule. The Cannon Fenske viscosity at 100° F. was 103.4 cks., the specific viscosity was 1.046 g/cc and the Gardner color was 1. Water dilutability was 15.4.

EXAMPLE 8

Following the procedure described in Example 6, 125 grams of 2,2-dimethyl-3-hydroxypropyl 2-2-dimethyl-3-hydroxypropionate was reacted at 48° to 132° C. with a total of 502 grams of ethylene oxide using a total of 1.3 grams of potassium as the catalyst. The ethylene oxide feed time was about 9.5 hours. At the completion of the feed 11.9 grams of magnesium silicate were added and the mixture was stirred for one hour and then cooled. The ester diol ethoxylate was filtered hot and stripped under vacuum.

The stripped ester diol ethoxylate residue product recovered weighed about 585.3 grams. It had an average of about 19 ethyleneoxy units in the molecule. The Cannon Fenske viscosity was 115.5 cks at 100° F. On standing, it solidified at 25° C. and melted at about 27° C.

EXAMPLE 9

In a manner similar to that described in Example 1, 805 grams of 2,2-dimethyl-3-hydroxypropyl 2,2-dimethyl-3-hydroxypropionate and 8 grams of boron trifluoride etherate were melted at 60° C. in a reaction flask. Over a period of about 1.75 hours a total of 811 grams of propylene oxide were added at a temperature of 57° to 60° C. The reaction mixture was stirred about another 2 hours; 32.3 grams of magnesium silicate were added and stirred at about 70° C. for about 1.5 hours. It was then stripped at 70° C. for 0.5 hour at 4–5 mm. of mercury and filtered. The liquid ester diol propoxylate residue product was clear and colorless and weighed 1,508 grams. It had an average of about 4 propyleneoxy units in the molecule.

What is claimed is:

1. An ester diol alkoxylate of the formula:

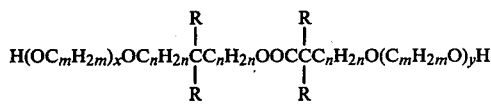

wherein m is an integer having a value of from 2 to 4; n is an integer having a value of from 1 to 5; x and y are integers each having a value of from 1 to 20; and R is an unsubstituted or substituted alkyl group having from 1 to 8 carbon atoms.

2. An ester diol alkoxylate as claimed in claim 1, wherein m has a value of 2 to 3; n a value of from 1 to 3; x and y each have values of from 1 to 10; and R is an alkyl group having from 1 to 3 carbon atoms.

3. An ester diol alkoxylate as claimed in claim 1, of the structural formula:

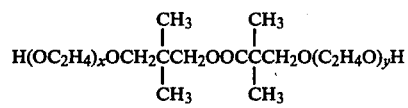

wherein the average sum of x plus y is about 2.

4. An ester diol alkoxylate of the structural formula as claimed in claim 3, wherein the average sum of x plus y is about 4.

5. An ester diol alkoxylate of the structural formula as claimed in claim 3, wherein the average sum of x plus y is about 6.

6. An ester diol alkoxylate of the structural formula as claimed in claim 3, wherein the average sum of x plus y is about 10.

7. An ester diol alkoxylate of the structural formula as claimed in claim 3, wherein the average sum of x plus y is about 19.

8. An ester diol alkoxylate as claimed in claim 1, of the structural formula:

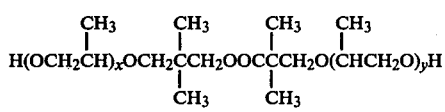

wherein the average sum of x+y is from about 2 to about 40.

9. An ester diol alkoxylate of the structural formula as claimed in claim 8, wherein the average sum of x plus y is about 4.

10. An ester diol alkoxylate as claimed in claim 1, wherein the $-(OC_mH_{2m})-$ groups are mixtures of ethyleneoxy and propyleneoxy groups.

* * * * *